United States Patent [19]

Marcar et al.

[11] Patent Number: 4,459,253

[45] Date of Patent: Jul. 10, 1984

[54] MANUFACTURE OF HOMOGENEOUS MAGNETIC RECORDING STRUCTURE

[75] Inventors: Haik Marcar, San Jose; Hans Traeg, Los Gatos, both of Calif.

[73] Assignee: International Business Machines Corporation, Armonk, N.Y.

[21] Appl. No.: 413,210

[22] Filed: Aug. 30, 1982

[51] Int. Cl.$^3$ .............................................. B02C 18/00
[52] U.S. Cl. ................... 264/140; 252/62.53; 264/328.18; 264/331.11; 360/135; 428/900; 525/906
[58] Field of Search ............. 264/D58, D25, 108, 140, 264/106, 349, 328.17, 328.18, 328.19, 331.11, 331.12; 360/133, 135, 134; 428/900; 252/62.53, 62.54; 525/906; 523/174; 524/431

[56] References Cited

U.S. PATENT DOCUMENTS

| | | | |
|---|---|---|---|
| 3,451,934 | 6/1969 | Hubbard | 252/62.54 |
| 3,916,038 | 10/1975 | Yamaguchi et al. | 427/127 |
| 4,320,080 | 3/1982 | Espar et al. | 252/62.54 |
| 4,327,139 | 4/1982 | Schaefer et al. | 428/900 |

FOREIGN PATENT DOCUMENTS 57-173143 10/1982 Japan ................................. 328.17/

OTHER PUBLICATIONS

Encyclopedia of Chemical Technology, N. J. Ballingtyn, vol. 18, pp. 605–610, 843–848.
Encyclopedia of Polymer Science and Tech., R. N. Johnson, vol. 11, pp. 460–463.

Primary Examiner—James B. Lowe
Assistant Examiner—Mike McGurk
Attorney, Agent, or Firm—Walter J. Madden, Jr.

[57] ABSTRACT

A new magnetic medium permits magnetic recording either in the longitudinal or the vertical direction. The medium, unlike prior art structures, does not require a nonmagnetic substrate. The medium is a rigid magnetic disk homogeneously prepared from ferric oxide particles and polyethersulfone in ratios and proportions that produce effective and inexpensive magnetic recording media.

3 Claims, No Drawings

MANUFACTURE OF HOMOGENEOUS MAGNETIC RECORDING STRUCTURE

BACKGROUND OF THE INVENTION

1. Field of the Invention

This invention relates to a homogeneous combination of a magnetic material and a nonmagnetic resin to produce a magnetic recording medium useful in either longitudinal or vertical magnetic recording.

2. Description of Prior Art

Conventional magnetic recording media structures, both flexible and rigid, consist of a magnetic material, usually ferric oxide, sprayed or otherwise coated over a nonmagnetic substrate (mylar for flexible magnetic tapes and disks, and aluminum alloys for rigid magnetic disks). In particular, the aluminum alloy substrates for rigid disks require extensive machining and other labor-intensive operations to render them suitable for the application thereto of a magnetic recording layer.

U.S. Pat. No. 3,451,934, Hubbard, discloses a process for molding magnetic material in which iron powder particles are individually coated with resin. The powdered material is molded into the desired shape under pressures from 1000 to 7000 pounds per square inch while heating the material to its softening temperature.

U.S. Pat. No. 3,916,038, Yamaguchi et al, discloses a process for producing a moldable magnetic particulate composition comprising finely divided core particles of a ferrite compound coated with a thermoplastic polymer. This process does not require sintering. Neither of there references refers to a magnetic recording disk.

SUMMARY OF THE INVENTION

The magnetic recording structure of the present invention is a homogeneous granulated mixture of polyethersulfone and ferric oxide powder, which, when processed through an adequately controlled and maintained injection molding system, produces a rigid recording disk. While this medium lends itself to perpendicular recording, it is also satisfactory for the more conventional longitudinal recording.

Because data can be recorded on and read from the present magnetic structure with a single pole read-/write head it is preferable to conventional aluminum or plastic substrate magnetic media. It has no vibrational characteristics; therefore data is not lost with shock or vibration.

DESCRIPTION OF THE PREFERRED EMBODIMENT

Prior to the present invention, suspension of oxide metals in polycarbonate substances had been limited because of two basic problems. First, no practical method existed for preparing a uniform mixture of a magnetic oxide metal and a polycarbonate substance. The normal mixture of magnetic oxide powder with plastic pellets produces very uneven distribution of the magnetic material.

A second problem has been temperature drop. The temperature difference between the melting point of the resin and the temperature of the mold has been as high as 500° F. However, the present method reduces this temperature difference to less than 300° F., which helps to produce flat and uniform magnetic disks.

The problem of uniform oxide distribution is solved in the present invention by mixing the powdered magnetic metal oxide with the molten resin at any desired concentration by volume, and then compressing the mixture through a system of metal meshes. The mixture is then cooled and diced into very small pellets. Each pellet now contains 10–50% of magnetic metal oxide enveloped in a plastic coating. When these pellets are put through an injection mold, a rigid magnetic recording structure is produced which lends itself to magnetic orientation of the magnetic particles therein while the molten substance is still in the hot mold. Best results can be insured if the polyethersulfone is allowed to remain at a constant temperature of 575° F. while mixing with the $Fe_2O_3$ powder. $Fe_2O_3$ powder must be mixed at a very slow rate.

The present technique produces an essentially uniform magnetic recording structure with the ferric oxide particles distributed through the PES binder. We have found that both surfaces of disks produced by this method have thin layers of PES thereon, which layers are useful in providing a lubricating function for a magnetic transducer associated with the disk.

It has been found that a mold made from 420 stainless steel with 44-46 RC hardness which will produce a highly polished mirror finish.

The following are representative of suitable values for the major parameters of the molding process.

Injection pressure: 9000 psi
Holding pressure: 5000 psi
Injection speed: Medium
Screw speed: 80 rpm
Stock temperature: 680° F.
Mold temperature: 230° F.
Injection time: 13 seconds
Hold time: 15 seconds
Mold close time: 10 seconds
Cycle time: 25 seconds A significant increase in surface finish can be achieved with mold temperatures above 350° F. Rigid magnetic disks of 5¼" and 8" in diameter have been successfully prepared, with 10% and 30% ferric oxide concentration in polyethersulfone resin.

We claim:

1. A method for forming a unitary magnetic recording disk comprising the steps of:
   mixing magnetic particles with liquid polyethersulfone,
   solidifying said liquid mixture,
   shredding said solidified mixture into pellets, and
   injection molding said shredded pellets to form a magnetic disk.

2. A method in accordance with claim 1 in which said ferric oxide is present in said polyethersulfone in a concentration from 10 to 50 percent by weight.

3. A method in accordance with claim 1 in which said ferric oxide particles are mixed with said polyethersulfone with said polyethersulfone at a temperature of approximately 575° F.

* * * * *